(12) United States Patent
Liu et al.

(10) Patent No.: US 11,977,250 B2
(45) Date of Patent: May 7, 2024

(54) LIGHTING KEYBOARD, BACKLIGHT MODULE AND LIGHTING SUBSTRATE

(71) Applicant: DARFON ELECTRONICS CORP., Taoyuan (TW)

(72) Inventors: Ying-Lan Liu, Taoyuan (TW); Hsin-Cheng Ho, Taoyuan (TW); Heng-Yi Huang, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 18/128,235

(22) Filed: Mar. 30, 2023

(65) Prior Publication Data

US 2023/0314691 A1    Oct. 5, 2023

Related U.S. Application Data

(60) Provisional application No. 63/430,675, filed on Dec. 7, 2022, provisional application No. 63/378,261, filed on Oct. 4, 2022, provisional application No. 63/368,272, filed on Jul. 13, 2022, provisional application No. 63/325,623, filed on Mar. 31, 2022.

(30) Foreign Application Priority Data

Apr. 8, 2022 (TW) .................................. 111113486
Mar. 9, 2023 (TW) .................................. 112108658

(51) Int. Cl.
F21V 8/00      (2006.01)

(52) U.S. Cl.
CPC .................................. *G02B 6/0051* (2013.01)

(58) Field of Classification Search
CPC .................................................... G02B 6/0051
See application file for complete search history.

(56) References Cited

U.S. PATENT DOCUMENTS

| | | | |
|---|---|---|---|
| 2,953,668 A | 9/1960 | Bassett, Jr. |
| 3,103,659 A | 9/1963 | Edwards |
| 3,157,771 A | 11/1964 | Roeser |

(Continued)

FOREIGN PATENT DOCUMENTS

| | | |
|---|---|---|
| CN | 101514801 A | 8/2009 |
| CN | 201758091 U | 3/2011 |

(Continued)

OTHER PUBLICATIONS

Huang, the specification, including the claims, and drawings in the U.S. Appl. No. 18/127,667, filed Mar. 29, 2023.

(Continued)

*Primary Examiner* — Arman B Fallahkhair
(74) *Attorney, Agent, or Firm* — Winston Hsu (57) ABSTRACT

A lighting keyboard includes a backlight module and at least one keyswitch. The backlight module includes a lighting substrate and a protruding structure. The lighting substrate includes two non-intersecting traces and a light emitting unit. The light emitting unit is connected between the two non-intersecting traces. A position of the protruding structure corresponds to a position of the light emitting unit and the protruding structure is located between the two non-intersecting traces. The at least one keyswitch is disposed on the backlight module.

14 Claims, 9 Drawing Sheets

(56) References Cited

U.S. PATENT DOCUMENTS

| | | | |
|---|---|---|---|
| 3,467,802 A | 9/1969 | Martin | |
| 3,639,745 A | 2/1972 | Shiki | |
| 4,346,275 A | 8/1982 | Iwakiri | |
| 4,535,396 A | 8/1985 | Guthrie | |
| 4,722,028 A | 1/1988 | Brannon | |
| 5,150,257 A | 9/1992 | Mohabbatizadeh | |
| 5,434,377 A | 7/1995 | Martin | |
| 6,210,010 B1 | 4/2001 | Pontetti | |
| 6,558,013 B2 | 5/2003 | Tholin | |
| 6,743,993 B1 * | 6/2004 | Clark | H01H 13/702 200/314 |
| 9,040,856 B2 * | 5/2015 | Chen | H01H 13/702 200/310 |
| 9,214,301 B2 * | 12/2015 | Chen | H01H 3/125 |
| 9,299,515 B2 | 3/2016 | Chen | |
| 9,633,803 B2 | 4/2017 | Wang | |
| 10,276,327 B2 * | 4/2019 | Chen | H01H 3/122 |
| 10,586,664 B2 * | 3/2020 | Yeh | H01H 13/023 |
| 11,036,306 B2 * | 6/2021 | Cheng | H01H 13/83 |
| 11,257,638 B2 | 2/2022 | Liang | |
| 11,371,676 B2 | 6/2022 | Huang | |
| 11,409,373 B2 | 8/2022 | Cheng | |
| 11,443,907 B2 | 9/2022 | Ho | |
| 11,515,107 B2 | 11/2022 | Chen | |
| 11,538,641 B2 | 12/2022 | Liang | |
| 2009/0140891 A1 | 6/2009 | Ragusa | |
| 2011/0037730 A1 | 2/2011 | Wang | |
| 2012/0275193 A1 | 11/2012 | Yoshida | |
| 2014/0166457 A1 | 6/2014 | Chen | |
| 2017/0352504 A1 | 12/2017 | Chen | |
| 2019/0027326 A1 | 1/2019 | Tsai | |
| 2019/0131088 A1 | 5/2019 | Yen | |
| 2019/0369744 A1 | 12/2019 | Wu | |
| 2019/0371538 A1 | 12/2019 | Huang | |
| 2020/0402748 A1 | 12/2020 | Cheng | |
| 2023/0047235 A1 | 2/2023 | Chen | |
| 2023/0317386 A1 | 10/2023 | Huang | |

FOREIGN PATENT DOCUMENTS

| | | |
|---|---|---|
| CN | 203377146 U | 1/2014 |
| CN | 104252987 A | 12/2014 |
| CN | 106301323 A | 1/2017 |
| CN | 106783308 A | 5/2017 |
| CN | 109243896 A | 1/2019 |
| CN | 110335775 A | 10/2019 |
| CN | 214310968 U | 9/2021 |
| CN | 113632249 A | 11/2021 |
| JP | 2019-139728 | 8/2019 |
| TW | I269993 | 1/2007 |
| TW | M321552 | 11/2007 |
| TW | M334393 | 6/2008 |
| TW | 200945114 | 11/2009 |
| TW | M395202 U1 | 12/2010 |
| TW | I416565 B | 11/2013 |
| TW | 201419343 A | 5/2014 |
| TW | M486089 U | 9/2014 |
| TW | I494960 B | 8/2015 |
| TW | I527075 B | 3/2016 |
| TW | M548881 U | 9/2017 |
| TW | I604484 B | 11/2017 |
| TW | 201824318 A | 7/2018 |
| TW | 1632577 B | 8/2018 |
| TW | 201916086 A | 4/2019 |
| TW | 202004809 A | 1/2020 |
| TW | 202004810 A | 1/2020 |
| TW | I725894 | 4/2021 |
| TW | 202143270 A | 11/2021 |
| TW | 202205328 A | 2/2022 |
| TW | 202211277 A | 3/2022 |
| TW | I760181 B | 4/2022 |

OTHER PUBLICATIONS

Liu, the specification, including the claims, and drawings in the U.S. Appl. No. 18/297,020, filed Apr. 7, 2023.
Chen, the specification, including the claims, and drawings in the U.S. Appl. No. 18/128,261, filed Mar. 30, 2023.
Huang, the specification, including the claims, and drawings in the U.S. Appl. No. 18/330,342, filed Jun. 6, 2023.
Chen, the specification, including the claims, and drawings in the U.S. Appl. No. 18/369,217, filed Sep. 18, 2023.
Chen, the specification, including the claims, and drawings in the U.S. Appl. No. 18/368,538, filed Sep. 14, 2023.
Liu, the specification, including the claims, and drawings in the U.S. Appl. No. 18/131,885, filed Apr. 7, 2023.
Chen, the specification, including the claims, and drawings in the U.S. Appl. No. 18/376,818, filed Oct. 4, 2023.

* cited by examiner

LIGHTING KEYBOARD, BACKLIGHT MODULE AND LIGHTING SUBSTRATE

CROSS REFERENCE TO RELATED APPLICATION

This application claims the benefit of U.S. Provisional Application No. 63/325,623, filed on Mar. 31, 2022. Further, this application claims the benefit of U.S. Provisional Application No. 63/430,675, filed on Dec. 7, 2022. Further, this application claims the benefit of U.S. Provisional Application No. 63/378,261, filed on Oct. 4, 2022. Further, this application claims the benefit of U.S. Provisional Application No. 63/368,272, filed on Jul. 13, 2022. The contents of these applications are incorporated herein by reference.

BACKGROUND OF THE INVENTION

1. Field of the Invention

The invention relates to a lighting keyboard, a backlight module and a lighting substrate and, more particularly, to a lighting keyboard, a backlight module and a lighting substrate capable of enhancing the overall illuminating consistency.

2. Description of the Prior Art

As technology advances, there are many types of keyboards in use. Users pay much more attention to visual effect of keyboard except basic input function while choosing keyboard. So far a lighting keyboard has been developed. The lighting keyboard attracts users in visual effect and can be used in darkness. Since the lighting keyboard of the prior art applies a low luminous light emitting diode (LED) to illuminate each of square keyswitches, the following problems may occur: 1) the main symbol above the LED is over-illuminated and the corner symbol(s) of keycap is too dark; 2) the surrounding outlet for keycap peripheral is inconsistent; and 3) the overall illuminating consistency on a single square keyswitch and on plural keyswitches are both not good.

SUMMARY OF THE INVENTION

The invention provides a lighting keyboard, a backlight module and a lighting substrate capable of enhancing the overall illuminating consistency, so as to solve the aforesaid problems.

According to an embodiment of the invention, a lighting keyboard comprises a backlight module and at least one keyswitch. The backlight module comprises a lighting substrate and a protruding structure. The lighting substrate comprises two non-intersecting traces and a light emitting unit. The light emitting unit is connected between the two non-intersecting traces. A position of the protruding structure corresponds to a position of the light emitting unit and the protruding structure is located between the two non-intersecting traces. The at least one keyswitch is disposed on the backlight module.

According to another embodiment of the invention, a backlight module comprises a lighting substrate and a protruding structure. The lighting substrate comprises a first reflective layer, a plurality of micro-structure regions and a light emitting unit. The plurality of micro-structure regions are formed on the first reflective layer. The light emitting unit is located between the plurality of micro-structure regions. A position of the protruding structure corresponds to a position of the light emitting unit and the protruding structure is located between the plurality of micro-structure regions.

According to another embodiment of the invention, a lighting substrate comprises two non-intersecting traces, a light emitting unit and a protruding structure. The light emitting unit is connected between the two non-intersecting traces. A position of the protruding structure corresponds to a position of the light emitting unit and the protruding structure being located between the two non-intersecting traces.

As mentioned in the above, the invention forms the protruding structure between the two non-intersecting traces or the plurality of micro-structure regions, and the position of the protruding structure corresponds to the position of the light emitting unit, such that an upper surface of the light emitting unit is flush with or lower than an upper surface of a light guide panel. Accordingly, the amount of light emitted by the light emitting unit entering the light guide panel can be increased, so as to enhance the overall illuminating consistency.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
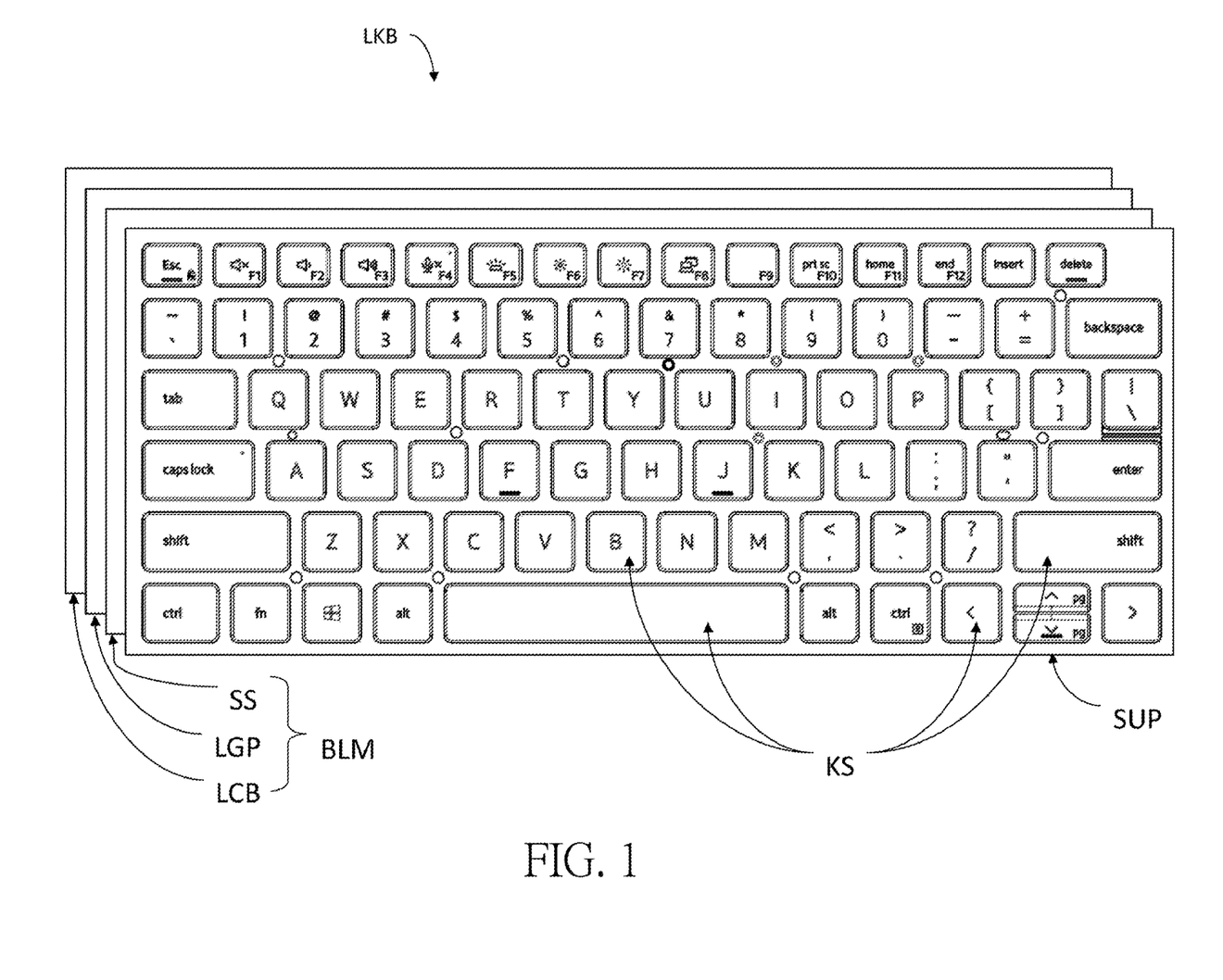
FIG. 1 is a schematic view illustrating a lighting keyboard according to an embodiment of the invention.

Referring to FIG. 1, FIG. 1 is a schematic view illustrating a lighting keyboard LKB according to an embodiment of the invention.

As shown in FIG. 1, the lighting keyboard LKB comprises a backlight module BLM and a plurality of keyswitches KS. A support plate SUP is disposed on the backlight module BLM and the keyswitches KS are disposed on the support plate SUP. In general, the keyswitches KS may comprise square keys and multiple keys (e.g. space key). It should be noted that the number, size and arrangement of the keyswitches KS may be determined according to practical applications, so the invention is not limited to the embodiment shown in the figure.

The backlight module BLM comprises a lighting substrate LCB, a light guide panel LGP and a shielding sheet SS. The light guide panel LGP is disposed on the lighting substrate LCB and the shielding sheet SS is disposed on the light guide panel LGP. Each keyswitch KS on the lighting keyboard LKB corresponds to at least one light emitting unit (e.g. LED) on the lighting substrate LCB of the backlight module BLM.

Figure 2:
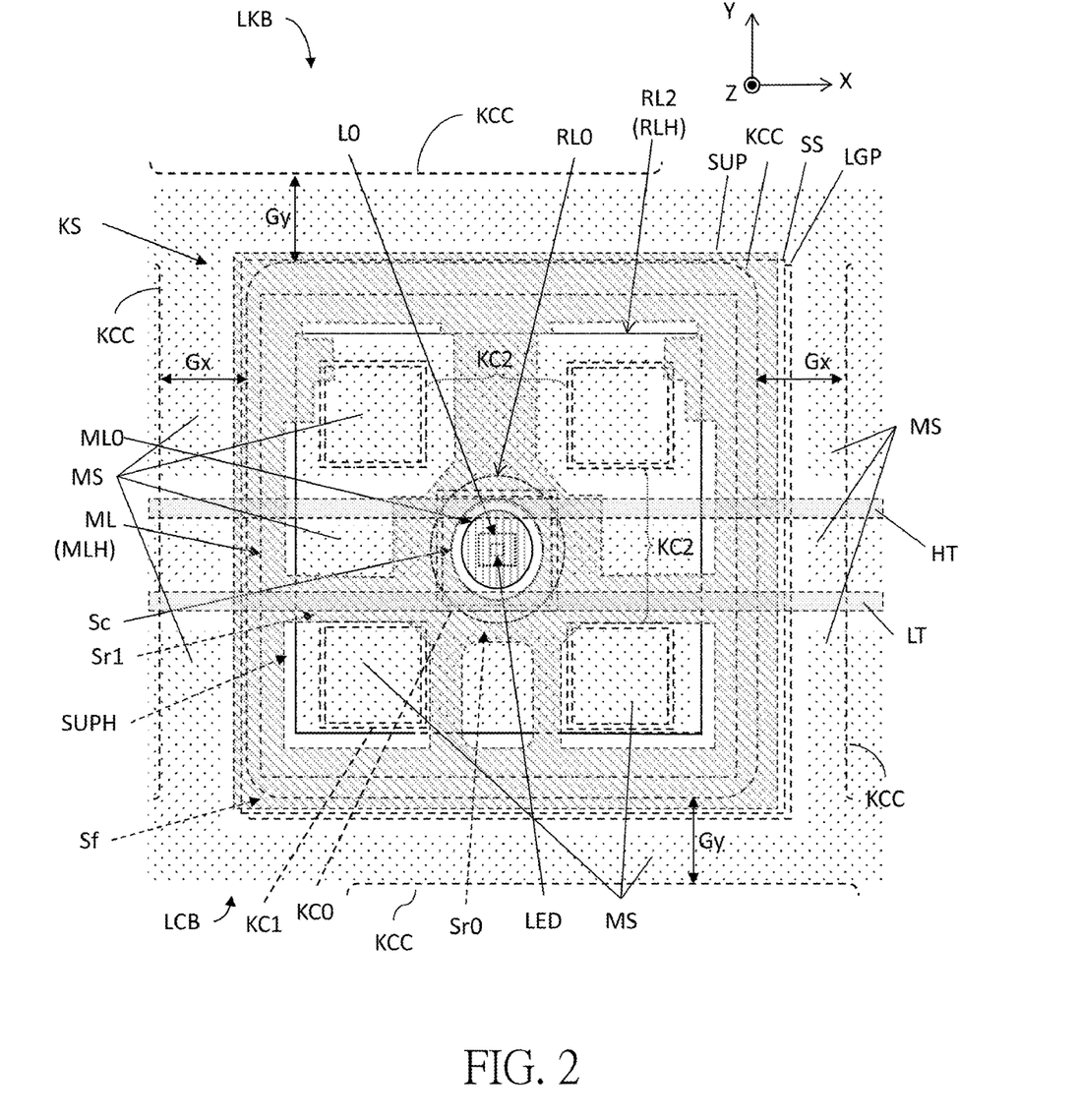
FIG. 2 is a partial top view illustrating the lighting keyboard shown in FIG. 1.
Figure 3:
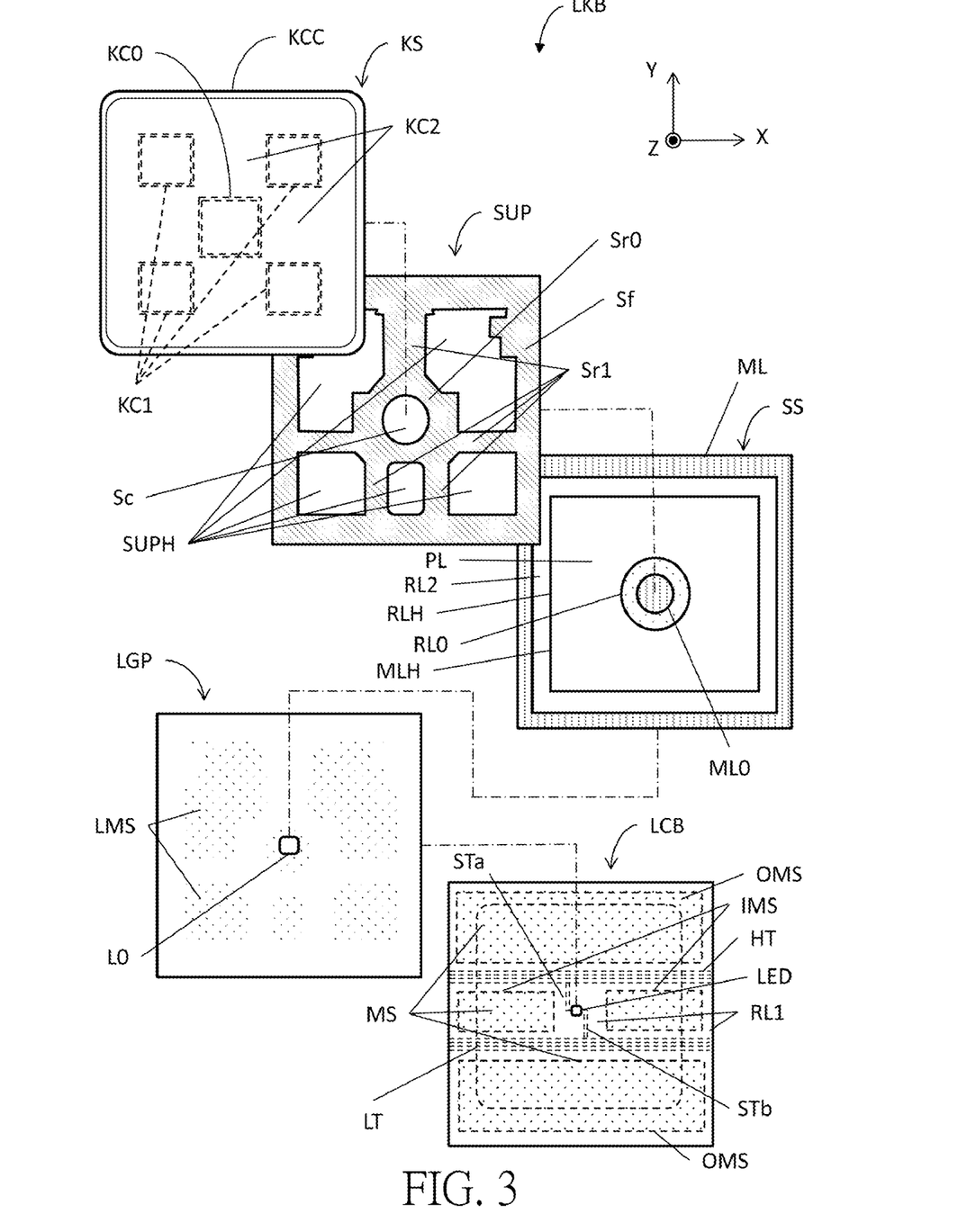
FIG. 3 is a partial exploded view illustrating the lighting keyboard shown in FIG. 1.
Figure 4:
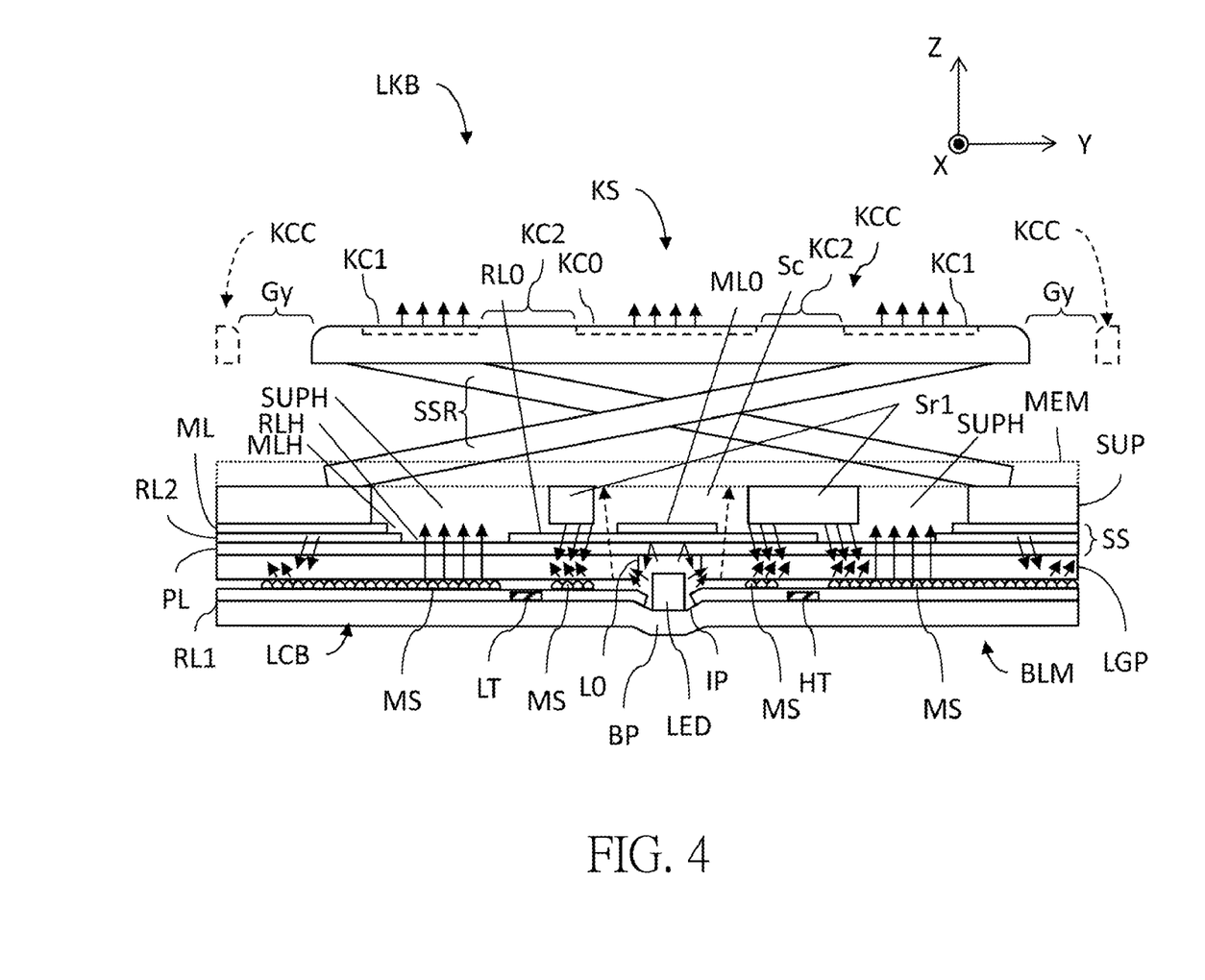
FIG. 4 is a partial sectional view illustrating the lighting keyboard shown in FIG. 1.

Referring to FIGS. 2 to 4, FIG. 2 is a partial top view illustrating the lighting keyboard LKB shown in FIG. 1, FIG. 3 is a partial exploded view illustrating the lighting keyboard LKB shown in FIG. 1, and FIG. 4 is a partial sectional view illustrating the lighting keyboard LKB shown in FIG. 1.

As shown in FIGS. 2 to 4, the lighting substrate LCB comprises two non-intersecting traces LT, HT, another two non-intersecting traces STa, STb, a light emitting unit LED, a first reflective layer RL1 and a plurality of micro-structure regions MS. The lighting substrate LCB may be a lighting circuit board. The light emitting unit LED is connected between the two non-intersecting traces STa, STb, and the light emitting unit LED is connected between the two non-intersecting traces LT, HT through the two non-intersecting traces STa, STb. In this embodiment, the traces LT, HT are main traces of the light emitting unit LED and the traces STa, STb are sub-traces of the light emitting unit LED, wherein the trace LT may be a low-voltage trace and the trace HT may be a high-voltage trace. The light emitting unit LED may be a white LED or a combination of RGB LEDs according to practical applications.

The first reflective layer RL1 is disposed on the two non-intersecting traces LT, HT and the other two non-intersecting traces STa, STb. The micro-structure regions MS are formed on the first reflective layer RL1. In this embodiment, the micro-structure regions MS may be a concave-convex structure formed on the first reflective layer RL1. For example, the lighting substrate LCB may be composed of a flexible circuit board and a copper mesh may be commonly used to improve the support strength of the circuit board. The first reflective layer RL1 may be formed by coating reflective paint or covering a reflective film on the surface of the flexible circuit board (including the surface of the copper mesh). The grid structure of the copper mesh may make the first reflective layer RL1 form regular concave points. The concave points function as reflective points capable of reflecting light back to the light guide panel LGP. In principle, the copper mesh does not overlap with the traces LT, HT on the flexible circuit board and does not electrically connect the traces STa, STb. In practical applications, the copper mesh can achieve an effect of shielding radio frequency interference, so the copper mesh may be connected to the ground of the traces.

In this embodiment, the micro-structure regions MS comprises two inner micro-structure regions IMS and two outer micro-structure regions OMS, wherein the two inner micro-structure regions IMS are located between the two non-intersecting traces LT, HT, and the two outer micro-structure regions OMS are located beyond the two non-intersecting traces LT, HT. The patterns of the two inner micro-structure regions IMS may be different from the patterns of the two outer micro-structure regions OMS, but the invention is not so limited. The light emitting unit LED is located between the micro-structure regions MS, i.e. the light emitting unit LED is located between the two inner micro-structure regions IMS and also located between the two outer micro-structure regions OMS.

The light guide panel LGP has a light guide hole LO and the light emitting unit LED is located in the light guide hole LO. The top surface and/or the bottom surface of the light guide panel LGP close to the light guide hole LO may have adhesive around the light guide hole LO to adhere the shielding sheet SS and/or the lighting substrate LCB respectively. Furthermore, the light guide panel LGP also has a plurality of micro-structure regions LMS.

The shielding sheet SS comprises a mask layer ML, a second reflective layer RL2 and a protection layer PL, wherein the mask layer ML, the second reflective layer RL2 and the protection layer PL may be stacked with each other by various manners. For example, each of the mask layer ML, the second reflective layer RL2 and the protection layer PL may be stacked on top, middle or bottom to form the shielding sheet SS. The mask layer ML is opaque. The second reflective layer RL2 may have reflective and translucent characteristics at the same time, i.e. the second reflective layer RL2 may reflect part of the light and allow part of the light to pass through. The mask layer ML may be black ink and the second reflective layer RL2 may be white ink, but the invention is not so limited. In this embodiment, the mask layer ML has a mask layer hole MLH and an inner mask layer ML0 located in the mask layer hole MLH, and the second reflective layer RL2 has a reflective layer hole RLH and an inner reflective section RL0 located in the reflective layer hole RLH. The mask layer hole MLH may be larger than, equal to or smaller than the reflective layer hole RLH, and the inner mask layer ML0 may be larger than, equal to or smaller than the inner reflective section RL0, wherein it depends on the desired illuminating effect. The inner mask layer ML0 and the inner reflective section RL0 are located above the light emitting unit LED. In this embodiment, the inner mask layer ML0 and/or the inner reflective section RL0 above the light emitting unit LED is at least partially projected between the two non-intersecting traces LT, HT or between the two non-intersecting traces STa, STb.

Each of the keyswitches KS comprises a part of the support plate SUP. In this embodiment, the support plate SUP has an inner hole Sc, a surrounding rib Sr0, a plurality of bridge ribs Sr1 and a support frame Sf, wherein the surrounding rib Sr0 surrounds the inner hole Sc, and the bridge ribs Sr1 connect the surrounding rib Sr0 and the support frame Sf. Furthermore, there are a plurality of peripheral holes SUPH between the bridge ribs Sr1, the surrounding rib Sr0 and the support frame Sf. In this embodiment, the two inner micro-structure regions IMS at least partially overlap with projections of the inner hole Sc, the surrounding rib Sr0, the bridge ribs Sr1 and/or the support frame Sf. Still further, the two outer micro-structure regions OMS at least partially overlap with projections of the surrounding rib Sr0, the plurality of bridge ribs Sr1 and/or the support frame Sf.

The keyswitch KS comprises a keycap KCC, a support mechanism SSR, a circuit board MEM and a support plate SUP. The keycap KCC is disposed with respect to the support plate SUP. The keycap KCC has an inner outlet KC0 and a plurality of outer outlets KC1, wherein the inner outlet KC0 and the outer outlets KC1 are surrounded by an opaque area KC2. The positions of the inner outlet KC0 and the outer outlets KC1 correspond to the positions of the inner hole Sc and the peripheral holes SUPH of the support plate SUP, such that the light emitted by the light emitting unit LED may be projected from the inner outlet KC0 and the outer outlets KC1 of the keycap KCC through the light guide panel LGP, the shielding sheet SS, the inner hole Sc and the peripheral holes SUPH of the support plate SUP. The support mechanism SSR is disposed between the keycap KCC and the support plate SUP. When the keycap KCC is pressed, the keycap KCC will move vertically toward the support plate SUP along with the support mechanism SSR. Furthermore, a restoration member (not shown) may be further disposed between the keycap KCC and the support plate SUP, wherein the restoration member may be, but is not limited to, a rubber dome. The circuit board MEM may have a switch (e.g. membrane switch or other trigger switches) corresponding to the keyswitch KS.

From top view, the light emitting unit LED, the light guide hole LO, the inner reflective section RL0, the inner mask layer ML0, the inner hole Sc, the inner outlet KC0 and the adhesive around the light guide hole LO may be located between the two non-intersecting traces LT, HT and/or STa, STb.

From top view, the light emitting unit LED, the light guide hole LO, the inner reflective section RL0, the inner mask layer ML0, the inner hole Sc, the inner outlet KC0 and the adhesive around the light guide hole LO may be located between the two inner micro-structure regions IMS.

As shown in FIG. 4, the backlight module BLM further comprises a protruding structure BP, wherein the position of the protruding structure BP corresponds to the position of the light emitting unit LED, and the protruding structure BP is located between the two non-intersecting traces LT, HT. Furthermore, the protruding structure BP is also located between the micro-structure regions MS, i.e. the protruding structure BP is located between the two inner micro-structure regions IMS and also located between the two outer micro-structure regions OMS. In this embodiment, the protruding structure BP is formed on the lighting substrate LCB and the protruding structure BP forms a notch IP for accommodating the light emitting unit LED, such that an upper surface of the light emitting unit LED is flush with or lower than an upper surface of the light guide panel LGP and higher than a lower surface of the light guide panel LGP. Since the shielding sheet SS is disposed on the light guide panel LGP, the upper surface of the light emitting unit LED is also flush with or lower than a lower surface of the shielding sheet SS, such that the shielding sheet SS can be kept flat and will not be pushed by the light emitting unit LED to partially enter the inner hole Sc of the support plate SUP. Accordingly, the amount of light emitted by the light emitting unit LED entering the light guide panel LGP can be increased, so as to enhance the overall illuminating consistency. Moreover, the circuit board MEM may have a switch disposed with respect to the inner hole Sc of the support plate SUP, such that the switch may partially enter the inner hole Sc of the support plate SUP without interfering with the shielding sheet SS and the light emitting unit LED below the shielding sheet SS.

Figure 5:
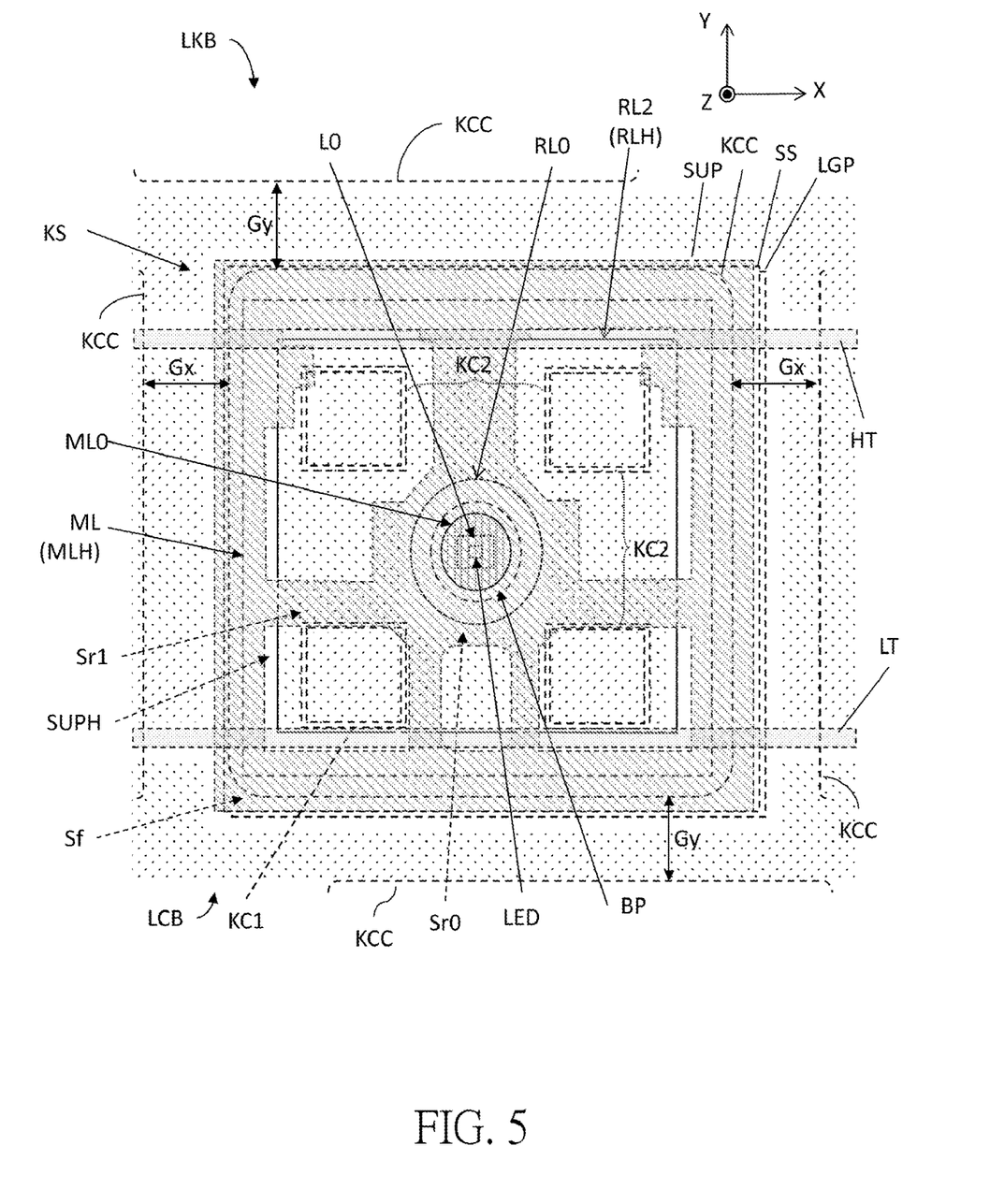
FIG. 5 is a partial top view illustrating the lighting keyboard according to another embodiment of the invention.
Figure 6:
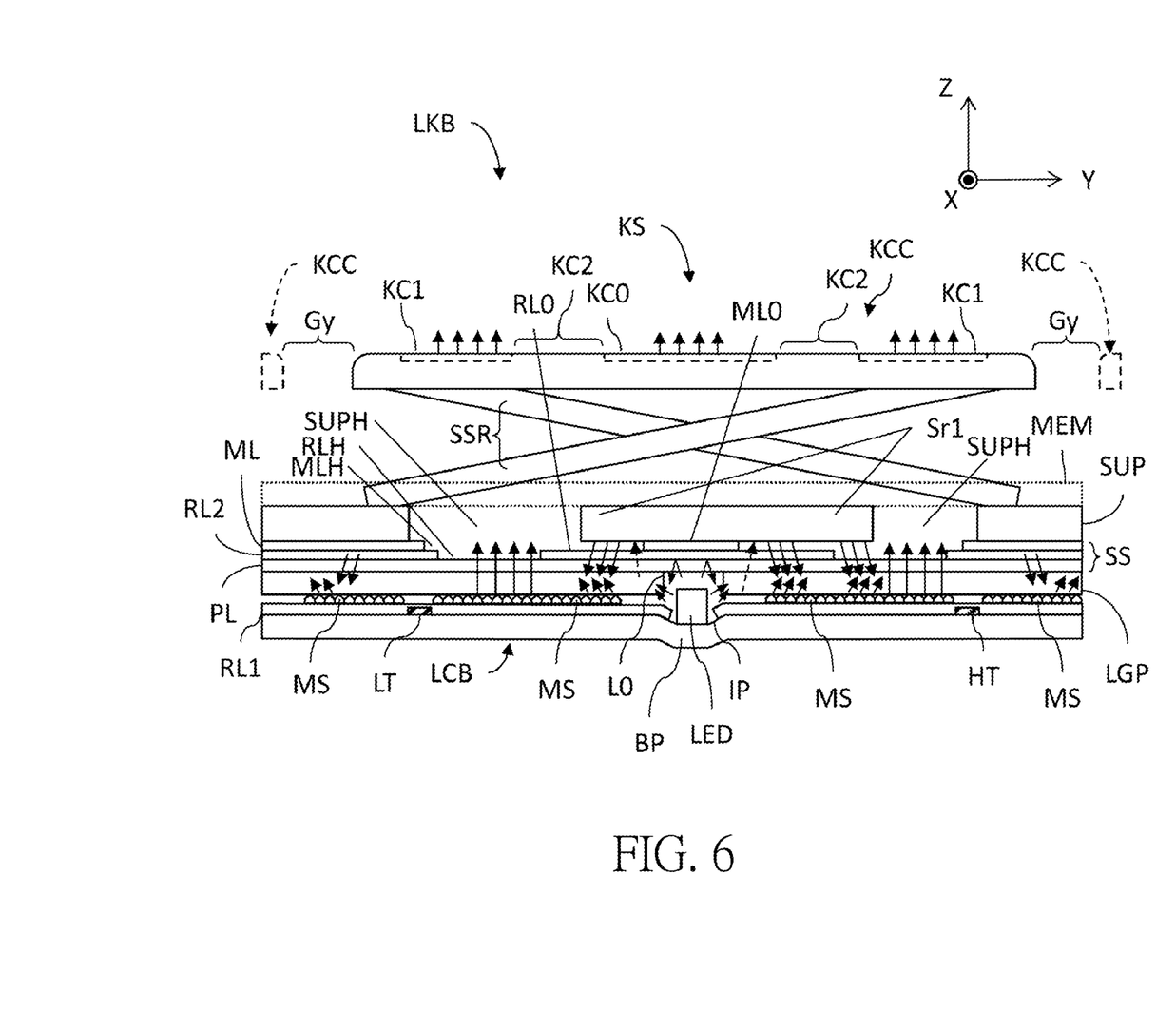
FIG. 6 is a partial sectional view illustrating the lighting keyboard shown in FIG. 5.

Referring to FIGS. 5 and 6, FIG. 5 is a partial top view illustrating the lighting keyboard LKB according to another embodiment of the invention, and FIG. 6 is a partial sectional view illustrating the lighting keyboard LKB shown in FIG. 5.

As shown in FIGS. 5 and 6, the support plate SUP may not have the aforesaid inner hole Sc. At this time, the shielding sheet SS is kept flat and will not be pushed by the light emitting unit LED. When the support plate SUP does not have the inner hole Sc, the keycap KCC may have no inner outlet KC0. However, if the keycap KCC has the inner outlet KC0, the peripheral holes SUPH around the central area of the keycap KCC may be used to emit light, such that the light is projected from the inner outlet KC0 without the inner hole Sc. In this embodiment, the two non-intersecting traces HT, LT may overlap with a projection of at least one of the at least one outer outlet KC1. As long as the two non-intersecting traces HT, LT meet at least one of the following three conditions, the traces HT, LT will not affect the light emitted from the outer outlet KC1 of the keycap KCC. Condition 1: the two non-intersecting traces HT, LT overlap with projections of the surrounding rib Sr0, the bridge ribs Sr1 and/or the support frame Sf. Condition 2: the two non-intersecting traces HT, LT overlap with projections of the mask layer ML and/or the second reflective layer RL2 of the shielding sheet SS. Condition 3: the two non-intersecting traces HT, LT overlap with projections of the opaque area KC2 of the keycap KCC.

Figure 7:
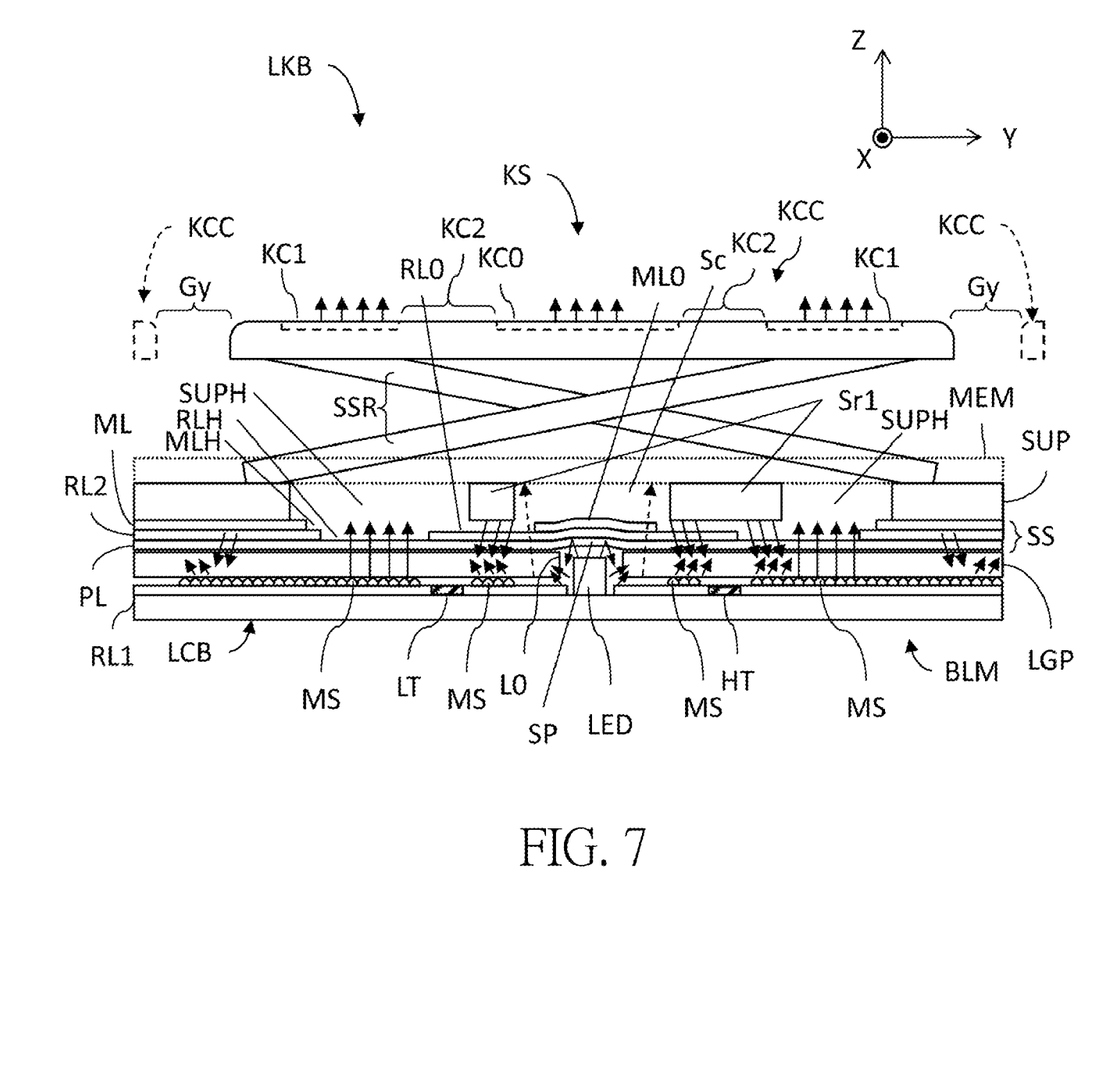
FIG. 7 is a partial sectional view illustrating the lighting keyboard according to another embodiment of the invention.

Referring to FIG. 7, FIG. 7 is a partial sectional view illustrating the lighting keyboard LKB according to another embodiment of the invention.

As shown in FIG. 7, a protruding structure SP of the backlight module BLM may be formed on the shielding sheet SS, wherein the light emitting unit LED is located below the protruding structure SP. The position of the protruding structure SP corresponds to the position of the light emitting unit LED, and the protruding structure SP is located between the two non-intersecting traces LT, HT. Furthermore, the protruding structure SP is also located between the micro-structure regions MS, i.e. the protruding structure SP is located between the two inner micro-structure regions IMS and also located between the two outer micro-structure regions OMS. In this embodiment, the protruding structure SP may be lower than or slightly enter the inner hole Sc of the support plate SUP, and an upper surface of the light emitting unit LED is flush with or lower than an upper surface of the light guide panel LGP or a lower surface of the shielding sheet SS.

Figure 8:
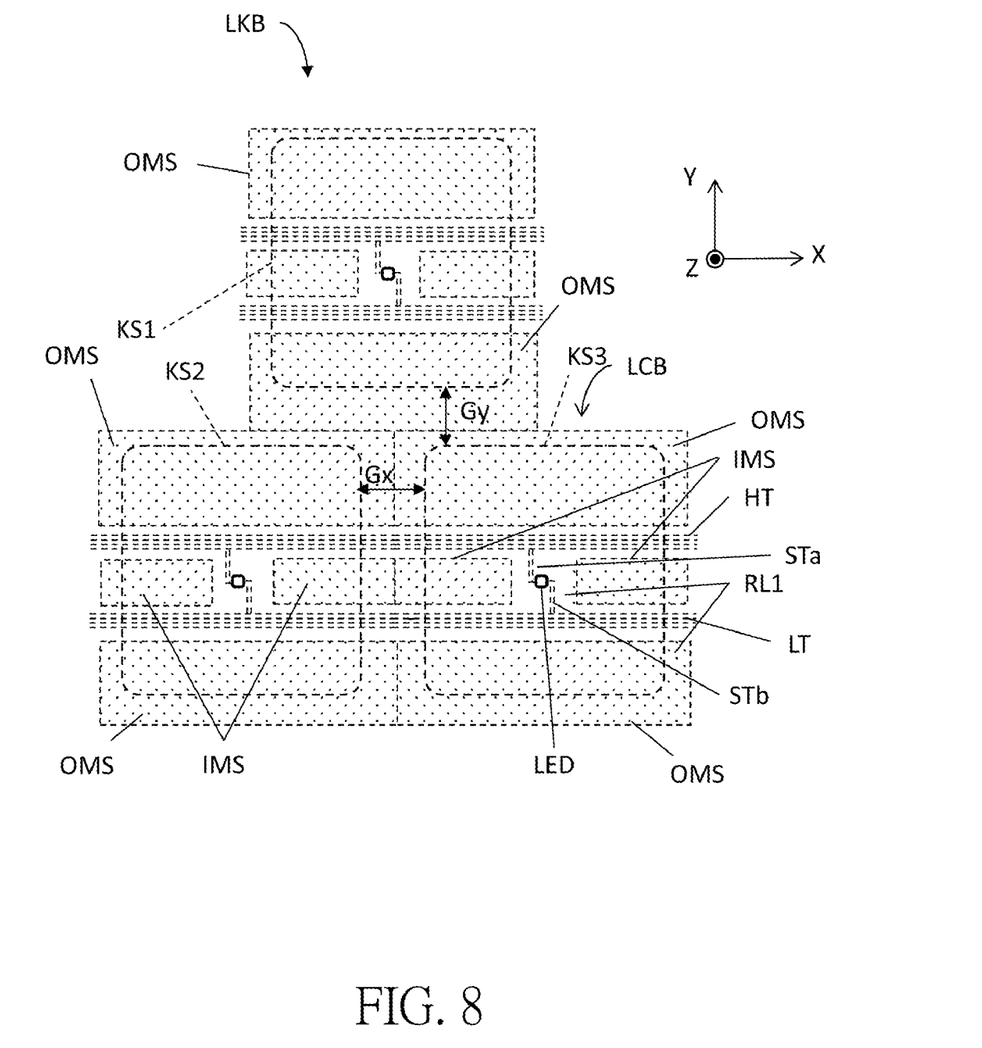
FIG. 8 is another partial top view illustrating the lighting keyboard shown in FIG. 1.

Referring to FIG. 8, FIG. 8 is another partial top view illustrating the lighting keyboard LKB shown in FIG. 1.

As shown in FIG. 8, at least parts of the micro-structure regions OMS, IMS overlap with the gaps Gx, Gy between any two adjacent keyswitches KS1, KS2, KS3. Three adjacent keyswitches KS1, KS2, KS3 may have three adjacent outer micro-structure regions OMS, wherein the three adjacent outer micro-structure regions OMS are joined together in the X and Y directions. The two outer micro-structure regions OMS disposed outside two non-intersecting traces of the lighting substrate LCB under a keyswitch KS may have the same pattern, which may have same size, same shape and same distance (outside the traces) in two identical regions. Within the projected range of a single keyswitch KS (e.g. square key), the two outer micro-structure regions OMS may have different patterns defined by the keyswitch KS. For two adjacent keyswitches KS in the Y direction, the two outer micro-structure regions OMS may have different patterns defined by the two adjacent keyswitches KS.

Figure 9:
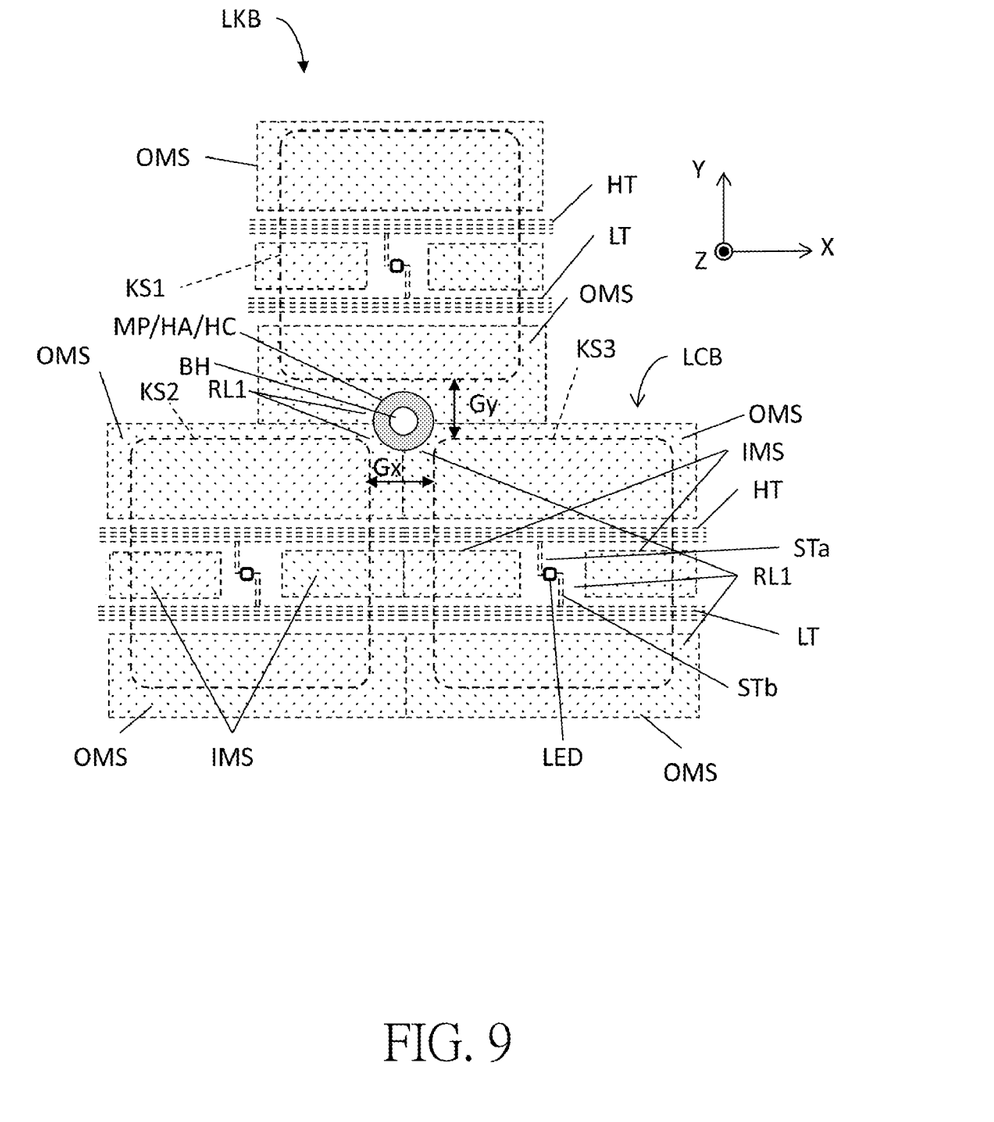
FIG. 9 is another partial top view illustrating the lighting keyboard shown in FIG. 1.

Referring to FIG. 9, FIG. 9 is another partial top view illustrating the lighting keyboard LKB shown in FIG. 1.

As shown in FIG. 9, a board hole BH may be formed on the lighting substrate LCB, wherein the board hole BH is used for fixing. A mask portion MP may be disposed on the lighting substrate LCB, wherein the mask portion MP surrounds the board hole BH and is used to shield and absorb light, so as to prevent the light from leaking from the board hole BH. The board hole BH and the mask portion MP on the lighting substrate LCB may correspond to a board hole and a mask portion (not shown) on the shielding sheet SS. A hole adhesive HA on the lighting substrate LCB may be disposed on the mask portion MP and surround the board hole BH. A hole clearance HC does not overlap with the outer micro-structure regions OMS or any micro-structure. The hole clearance HC without the first reflective layer RL1 may be defined between the first reflective layer RL1 and the board hole BH. The hole clearance HC without an adhesive may be defined between the hole adhesive HA and the board hole BH. The inner micro-structure regions (between the two non-intersecting traces HT, LT and/or between the two non-intersecting traces STa, STb) do not overlap with the board hole BH, the hole adhesive HA and/or the hole clearance HC. A plurality of adjacent keyswitches KS1, KS2, KS3 in the X and/or Y direction may have adjacent outer micro-structure regions OMS that jointly surround the mask portion MP, the board hole BH, the hole adhesive HA and/or the hole clearance HC. The mask portion MP, the board hole BH, the hole adhesive HA and/or the hole clearance HC is located between the traces HT, LT corresponding to the keyswitch KS1 and the traces HT, LT correspond to the keyswitches KS2, KS3. For further explanation, the mask portion MP, the board hole BH, the hole adhesive HA and/or the hole clearance HC may be located between the trace LT corresponding to the keyswitch KS1 and the trace HT correspond to the keyswitches KS2, KS3. It should be noted that the mask portion MP, the hole adhesive HA and the hole clearance HC are schematically illustrated at the same position shown in FIG. 9. However, the definitions of the mask portion MP, the hole adhesive HA and the hole clearance HC can be clearly understood from the above description.

As mentioned in the above, the invention forms the protruding structure between the two non-intersecting traces or the plurality of micro-structure regions, and the position of the protruding structure corresponds to the position of the light emitting unit, such that an upper surface of the light emitting unit is flush with or lower than an upper surface of a light guide panel. Accordingly, the amount of light emitted by the light emitting unit entering the light guide panel can be increased, so as to enhance the overall illuminating consistency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting keyboard comprising:
    a backlight module comprising a lighting substrate and a protruding structure, the lighting substrate comprising two non-intersecting traces and a light emitting unit, the light emitting unit being connected between the two non-intersecting traces, a position of the protruding structure corresponding to a position of the light emitting unit, the protruding structure being located between the two non-intersecting traces, wherein the lighting substrate further comprises a first reflective layer and two inner micro-structure regions, the two inner micro-structure regions are located between the two non-intersecting traces, the first reflective layer is overlapped with the two non-intersecting traces, and the two inner micro-structure regions are formed on the first reflective layer;
    at least one keyswitch disposed on the backlight module; and
    a support plate, configured between the at least one keyswitch and the backlight module, wherein the support plate has a support frame, at least one hole and a plurality of ribs defining the at least one hole within the support frame, and the two inner micro-structure regions at least partially overlap with at least one of projections of the at least one hole, the plurality of ribs and the support frame.

2. The lighting keyboard of claim 1, wherein the protruding structure is located between the two inner micro-structure regions.

3. The lighting keyboard of claim 2, wherein the lighting substrate further comprises two outer micro-structure regions located beyond the two non-intersecting traces, the at least one keyswitch comprises a support plate, the support plate has a surrounding rib, a plurality of bridge ribs and a support frame, the plurality of bridge ribs connect the surrounding rib and the support frame, and the two outer micro-structure regions at least partially overlap with at least one of projections of the surrounding rib, the plurality of bridge ribs and the support frame.

4. The lighting keyboard of claim 3, wherein the at least one keyswitch comprises a keycap, the keycap is disposed with respect to the support plate, the keycap has at least one outer outlet, and the two non-intersecting traces overlap with a projection of at least one of the at least one outer outlet.

5. The lighting keyboard of claim 4, wherein the two non-intersecting traces overlap with at least one of projections of the surrounding rib, the plurality of bridge ribs and the support frame.

6. The lighting keyboard of claim 4, wherein the backlight module further comprises a light guide panel and a shielding sheet, the light guide panel is disposed on the lighting substrate, the shielding sheet is disposed on the light guide panel, the shielding sheet comprises a mask layer and a second reflective layer, the mask layer and the second reflective layer are stacked with each other, and the two non-intersecting traces overlap with at least one of projections of the mask layer and the second reflective layer.

7. The lighting keyboard of claim 2, wherein the at least one hole comprises an inner hole, the plurality of ribs comprises a surrounding rib and a plurality of bridge ribs, the surrounding rib surrounds the inner hole, the plurality of bridge ribs connect the surrounding rib and the support frame, and the two inner micro-structure regions at least partially overlap with at least one of projections of the inner hole, the surrounding rib, the plurality of bridge ribs and the support frame.

8. The lighting keyboard of claim 2, wherein the two inner micro-structure regions at least partially overlap with a projection of a gap between any two adjacent keyswitches of the at least one keyswitch.

9. The lighting keyboard of claim 2, wherein the lighting substrate further comprises two outer micro-structure regions, the two outer micro-structure regions are located beyond the two non-intersecting traces, and patterns of the two inner micro-structure regions are different from patterns of the two outer micro-structure regions.

10. The lighting keyboard of claim 1, wherein the protruding structure is formed on the lighting substrate and the protruding structure forms a notch for accommodating the light emitting unit.

11. The lighting keyboard of claim 10, wherein the backlight module further comprises a light guide panel disposed on the lighting substrate, the light guide panel has a light guide hole, the light emitting unit is located in the light guide hole, and an upper surface of the light emitting unit is flush with or lower than an upper surface of the light guide panel and higher than a lower surface of the light guide panel.

12. The lighting keyboard of claim 1, wherein the backlight module further comprises a light guide panel and a shielding sheet, the light guide panel is disposed on the lighting substrate, the shielding sheet is disposed on the light guide panel, the protruding structure is formed on the shielding sheet, and the light emitting unit is located below the protruding structure.

13. The lighting keyboard of claim 12, wherein the light guide panel has a light guide hole, the light emitting unit is located in the light guide hole, and an upper surface of the light emitting unit is flush with or lower than an upper surface of the light guide panel or a lower surface of the shielding sheet.

14. The lighting keyboard of claim 1, wherein the at least one keyswitch comprises a keycap, the keycap has at least one opaque area, and the two non-intersecting traces overlap with a projection of the at least one opaque area.

* * * * *